United States Patent
Cousin et al.

(10) Patent No.: US 6,821,540 B2
(45) Date of Patent: Nov. 23, 2004

(54) PROCESS FOR TREATING VEGETABLES AND FRUIT BEFORE COOKING

(75) Inventors: Jean-Francois Cousin, Lille (FR); Fabrice Desailly, Vimy (FR); Adeline Goullieux, Mareuil la Motte (FR); Jean-Pierre Pain, Le Meux (FR)

(73) Assignee: McCain Foods Limited, Florenceville (CA)

( * ) Notice: Subject to any disclaimer, the term of this patent is extended or adjusted under 35 U.S.C. 154(b) by 170 days.

(21) Appl. No.: 10/326,145

(22) Filed: Dec. 23, 2002

(65) Prior Publication Data

US 2003/0165608 A1 Sep. 4, 2003

Related U.S. Application Data

(63) Continuation of application No. PCT/CA01/00917, filed on Jun. 20, 2001.

(30) Foreign Application Priority Data

Jun. 21, 2000 (FR) .............................................. 00 07948

(51) Int. Cl.⁷ ............................. A23N 7/00; A23N 7/02; A23B 4/015
(52) U.S. Cl. ........................ 426/237; 426/518; 426/615
(58) Field of Search ................................. 426/237, 615, 426/518; 83/195.15

(56) References Cited

U.S. PATENT DOCUMENTS 3,997,678 A    12/1976  Vigerstrom
6,093,432 A  *  7/2000  Mittal et al. ................. 426/237

FOREIGN PATENT DOCUMENTS

FR    2 250 483 A    6/1975
GB    2 122 870 A    1/1984

OTHER PUBLICATIONS

DeBelle, Nele et al. 2000. J. Plant Physiol. vol. 157, pp. 263–272.*
Rastogi, N. K. et al. 1999. J. Food Science 64(6)1020–1023.*

* cited by examiner

Primary Examiner—Carolyn Paden
(74) Attorney, Agent, or Firm—Bereskin & Parr

(57) ABSTRACT

A process for treating vegetables and fruit in order to reduce their resistance to cutting. Treatment involves the application of a high electric field directly to the vegetables and fruit, under such conditions that the resulting temperature increase for the vegetables and fruit is almost zero and at any rate, sufficiently low not to amount to a preheating step.

6 Claims, 1 Drawing Sheet

PROCESS FOR TREATING VEGETABLES AND FRUIT BEFORE COOKING

This application is a continuation of international application number PCTCA01/009917, filed Jun. 20, 2001.

FIELD OF THE INVENTION

This invention concerns a process for treating tubers or roots, and more generally, vegetables and fruit such as potato, beet, turnip, carrot, salsify etc., before cooking.

BACKGROUND OF THE INVENTION

The invention applies particularly, but not exclusively, to the processing of potato tubers in the production of French fries.

Traditionally, the processing of vegetables includes a sequence of automated stages, during which vegetable tubers or roots are washed, peeled, size-sorted, cut, blanched, dried, possibly immersed in frying oils, frozen and packed. In the cutting stage, the vegetables are sliced into pieces, rings, or specifically as relates to French fries, into strips.

By way of example, the description below will particularity focus on the processing of potato tubers intended to make French fries, which is a preferred application of the process of this invention.

In order to ease tuber cutting, in other words, to reduce resistance to cutting, tubers traditionally are submitted to heat processing, which increases their flexibility. Typically, the tubers are directed toward a horizontal cylindrical tank, which is equipped with an endless screw, and contains water heated to a temperature of 40° to 60° C., where they are left for a period of 20 to 40 minutes. This process of preparing the tuber for cutting through heat processing, requires a major volume of water (from 25 to 30 cubic meters of water for an automated line producing 15 tonnes of finished product per hour); this volume of water also has to be renewed, heated and maintained at the appropriate temperature.

This typical process has a number of drawbacks, including:

At the surface of the tuber, a cooking ring is produced, due to starch gelatinization. This degrades the quality of the finished product in terms of texture and colour. The colour difference of the cook ring is viewed as a defect to be eliminated, which results in a loss of material;

Losses resulting from dissolution of tuber material in the water;

Odors that may develop due to bacterial activity in the water and biological reactions;

Processing which is not homogenous, since it operates through diffusion toward the inside of the tubers; a desired inside temperature is reached more rapidly in small tubers than in medium or large tubers.

Pre-treatment to reduce the tubers' resistance to cutting is necessary to ease the action of cutting tools, avoid twisting of the cut strips or a poor cut, as well as damage to the cutting knives. Inappropriate pre-treatment may result in a non-shear cut, and a "shattering" or crushing effect, that appears on the sliced strips as slits that are likely to make the strips fragile. Non-shear cutting means a major deterioration of the vegetable cells in the product, and therefore, large loss of material due to deteriorated cells. If a strip breaks below a minimal desired length, lit will have to be eliminated or directed to a stream for by-product processing. Also, slits that appear during non-shear cutting will take on a brown discoloration during the cooking process; that harms the product appearance and increases oil absorption.

It would be desirable to submit tubers to treatment that will prepare them for cutting, and is efficient; in other words, a kind of treatment which avoids the "shattering" effect, while minimizing or even eliminating the drawbacks that were mentioned about traditional preheating.

To overcome the limitations of conventional methods of pretreating tubers, solutions involving electrical processes were investigated.

The application of pulsed electric fields is known in various areas of food product processing, for example food industry, specifically for sugar extraction from beets, or sterilization of food products.

U.S. Pat. No. 3,997,678 (Vigerstrom) discloses a process for processing potato tubers that are intended to be made into French fries. The process includes a blanching stage between the cutting and the immersion into frying oil, during which the strips are immersed in a bath of water and heated until sterilization is achieved by application of an electric field through electrodes immersed in the water. Traditionally, a blanching or precooking stage is included in processes for making tubers into fries. It is meant to reduce the temperature or the frying time, and consists in a preheating stage, in order to extract reducing sugars and inactivate enzymes. It is seen as a gelatinization of starch.

In contrast to the process that is disclosed in U.S. Pat. No. 3,997,678, in which the application of an electric field occurs following cutting to heat and sterilize the product, the present invention focuses on treatment before cutting, to reduce the tuber resistance to cutting.

SUMMARY OF THE INVENTION

The invention provides a process that includes, as well known, a treatment stage for tubers or roots, and more generally, of vegetables and fruit in order to reduce their resistance to cutting, and thus reduce any loss of material during subsequent stages of the manufacturing process.

According to the invention, said stage consists in the application of a high electric field directly to vegetables and fruit, under such conditions that the resulting temperature increase for the vegetables and fruit is almost zero or at least sufficiently low as not to amount to a preheating stage. The application of a high electric field, such as is used for extracting sugar from beet and precooking fries, translates to vegetables and fruit, and particularly to potato tubers, with the effect of softening which is favourable to shear cutting during subsequent stages for transforming the tubers into fry strips. The process is found to be insensitive to tuber volume, whatever the size of the tuber, with the absence of any noticeable elevation of the tuber temperature; as such no cooking ring is formed that would lead to loss of material as occurs in the case of heat processing.

Tests have shown that, to obtain optimal cutting, tubers should be immersed in water and an electric field of 46 to 65 V/cm applied between electrodes in the water, during a period of between 3 and 5 seconds.

BRIEF DESCRIPTION OF DRAWING

Other features and advantages of the invention will appear from the following description of a preferred embodiment which is given as a non-limiting example of a process according to the invention.

In the enclosed drawing, the single figure schematically represents an apparatus for carrying out the process.

DESCRIPTION OF PREFERRED EMBODIMENT

Figure 1:
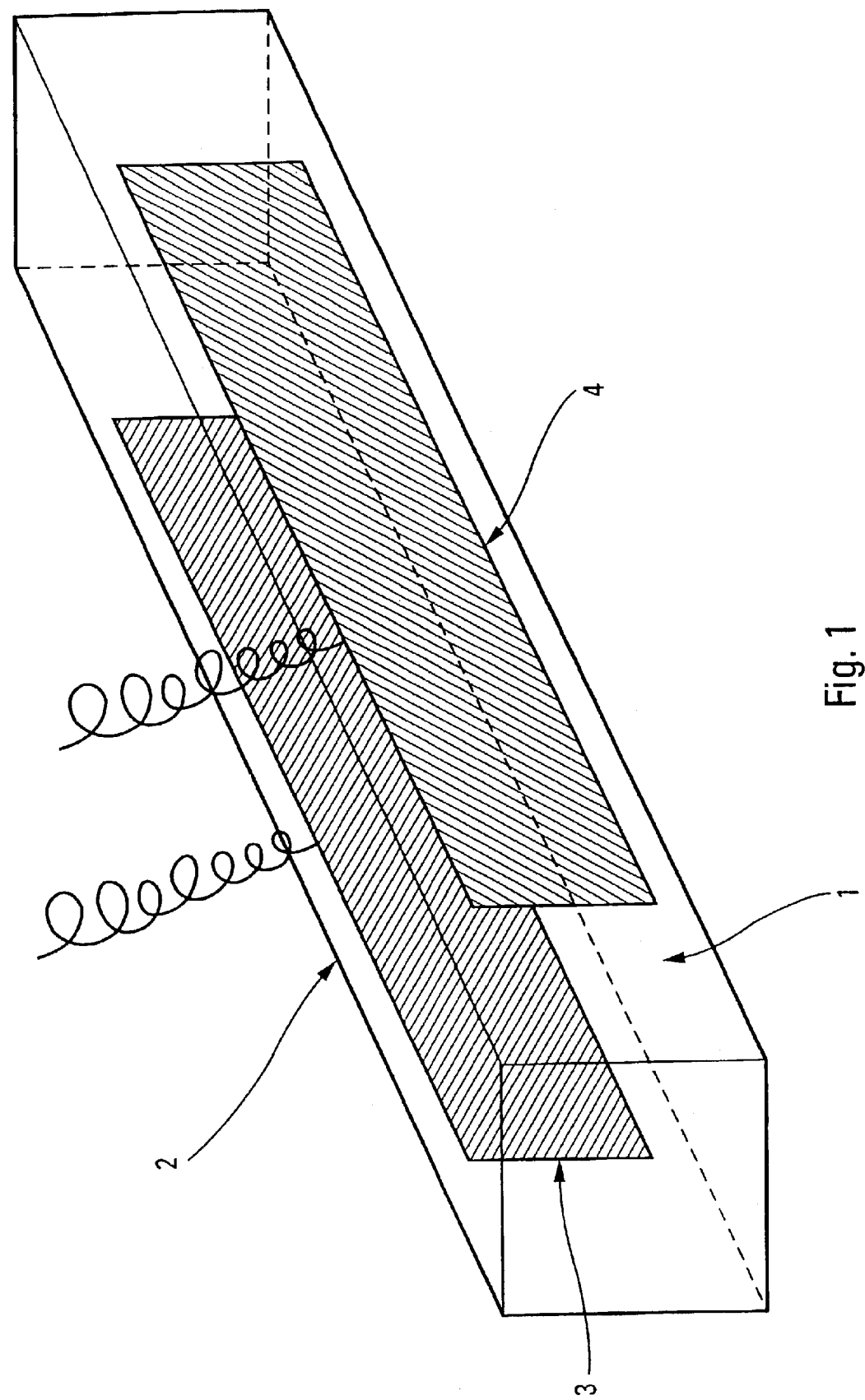

The following description relates to treatment of tubers or roots, specifically potato tubers intended for French fry manufacturing. However, it should be understood that all that follows may be generally applied to vegetables and fruit intended to be cut.

After being peeled, the tubers or roots are immersed in water 1 in a tank 2 that is electrically isolated, and in which two electrodes 3, 4 made of titanium for instance, are immersed.

Appropriate systems such as wheels, screws, pipes or conveyors, may be used to continuously transport the tubers through the space between the electrodes.

The water conductivity is adjusted to be close to, and preferably below, the conductivity of tubers or roots, in order to limit any water heating. For instance, the water conductivity is set to be below about 0.020 S/m.

Preferably, treatment is performed at a low frequency, for instance, 50 or 60 Hz.

As an example, for potato tubers, an electric field between 45 and 65 V/cm is applied to electrodes 3, 4 during periods of from 3 to 5 seconds.

For an electric field of 65 V/m applied for 5 seconds, the increase in temperature found for the water/tuber mixture is 5.6° C.

For an electric field of 45 V/cm applied for 3 seconds, this temperature increase is then only 1.6° C.; in other words, the temperature increase is still sufficiently low that it produces neither any loss of material into the water, nor any cooking ring.

Precisely determining the voltage applied, and the application period, depends on the potato variety. The electrical processing has an impact on the colour, the texture and the taste of the finished product.

Comparative tests performed on different potato varieties (Bintje, Russet Burbank, Premiere varieties) have shown, following electrical processing, a quality of cutting which is at least equal to that obtained following traditional heat processing. Based on a sample strip which was heat processed, to which a sensorial score (tactile appreciation of the roughness of the strip edge) of 2.5 was given, tests with electric field pre-treatment gave a similar sensorial score of 3.5 for all varieties tested. It was also noted that the quality of cutting increased as the electric field increased.

These qualitative assessments were performed together with quantitative texture measurements, performed with a "texturometer"; a device that allows quantification of the tuber resistance to slicing. Results showed that the energy that is necessary to slice tubers which have been electrically processed is similar to the energy necessary to slice heat processed tubers.

Also, it was found that the energy at slicing decreased with an increase in electric field.

This definitely proves the efficiency of an electric field, which is applied under the conditions of the invention.

In addition to guaranteeing a shear cut, electrical processing according to the invention has several advantages, including:

The consumption of a reduced volume of water (renewed at a lower rate), since there is no need to maintain a given temperature, and since the material, not being cooked, and therefore no longer has a tendency to dissolve in the water;

A very short processing period (3 to 5 seconds, compared to the 20 to 40 minutes that are necessary for heat processing);

Homogenous processing in volume, whatever the tuber size;

Substantial energy savings. The energy consumed during heat processing is about 40 Wh/kg, whereas energy consumed during electrical processing is about 6 Wh/kg;

Electrical treatment before cutting increases enzymatic inactivation performed during blanching.

Electrical treatment also helps reduce the blanching time before frying, and thereby loss of material (hydrocarbons and starch) dissolved in the water because of precooking performed during the blanching stage.

Obviously, the invention is not limited to the embodiment described, and many modifications may be made, while keeping within this invention.

In particular, while the above example concerns the processing of potato tubers for French fry manufacturing, it would be easy for a skilled person to experimentally determine optimal operating conditions for processing other tubers or roots, or more generally, other vegetables or fruits, and specifically, to choose a processing period associated with an electric field of a given intensity.

Preferably, the electric field should be between 30 and 75 V/cm approximately, and the processing period between 1 and 10 seconds approximately.

This invention is not limited to the use of an aqueous environment, and is workable with any liquid or fluid which conducts electricity to help create an electric field in accordance with the present invention.

We claim:

1. A process for treating vegetables and fruit before cooking in order to reduce their resistance to cutting, characterized by the application of a high electric field directly to the vegetables and/or fruit under conditions such that the resulting increase in the temperature of the vegetables and/or fruit is almost zero or at least sufficiently low as to not amount to a preheating step.

2. A process as claimed in claim 1, characterized in that the electric field is applied through titanium electrodes that are immersed in water in a tank containing the vegetables and/or fruit.

3. A process as claimed in claim 1 or 2, characterized in that an electric field of 45 to 65 V/cm is applied during a period between 3 and 5 seconds.

4. A process as claimed in one of claims 1 to 3, characterized in that, during application of the electric field, the vegetables and/or fruit are immersed in water having a conductivity that is below or equal to the conductivity of the vegetables and/or fruit.

5. A process as claimed in claim 4, characterized in that the conductivity of the water is below 0.020 S/m.

6. A process as claimed in any one of claims 1 to 5, characterized in that the process is applied to processing of potatoes prior to cutting the potatoes into strips for the purpose of producing French fries.

* * * * *